(12) United States Patent
Sulc et al.

(10) Patent No.: US 9,443,164 B2
(45) Date of Patent: Sep. 13, 2016

(54) SYSTEM AND METHOD FOR PRODUCT IDENTIFICATION

(71) Applicant: Xerox Corporation, Norwalk, CT (US)

(72) Inventors: Milan Sulc, Mlada Boleslav (CZ); Albert Gordo Soldevila, Grenoble (FR); Diane Larlus Larrondo, La Tronche (FR); Florent C. Perronnin, Domène (FR)

(*) Notice: Subject to any disclaimer, the term of this patent is extended or adjusted under 35 U.S.C. 154(b) by 21 days.

(21) Appl. No.: 14/557,677

(22) Filed: Dec. 2, 2014

(65) Prior Publication Data

US 2016/0155011 A1 Jun. 2, 2016

(51) Int. Cl.
| | |
|---|---|
| G06K 9/00 | (2006.01) |
| G06K 9/46 | (2006.01) |
| G06T 7/00 | (2006.01) |
| G06K 9/48 | (2006.01) |

(52) U.S. Cl.
CPC ............ *G06K 9/4633* (2013.01); *G06K 9/481* (2013.01); *G06T 7/0044* (2013.01); *G06T 7/0046* (2013.01); *G06K 2009/485* (2013.01); *G06T 2207/20024* (2013.01); *G06T 2207/20061* (2013.01)

(58) Field of Classification Search
None
See application file for complete search history.

(56) References Cited

U.S. PATENT DOCUMENTS

| | | | |
|---|---|---|---|
| 3,069,654 A | 12/1962 | Hough | |
| 2003/0021481 A1 | 1/2003 | Kasutani | |
| 2007/0005356 A1 | 1/2007 | Perronnin | |
| 2007/0133878 A1* | 6/2007 | Porikli | G06K 9/4642 382/190 |
| 2007/0258648 A1 | 11/2007 | Perronnin | |
| 2008/0069456 A1 | 3/2008 | Perronnin | |
| 2008/0240572 A1 | 10/2008 | Hoshii | |
| 2008/0317358 A1 | 12/2008 | Bressan et al. | |
| 2009/0144033 A1 | 6/2009 | Liu et al. | |
| 2009/0180663 A1* | 7/2009 | Stoddart | G06T 7/004 382/100 |
| 2009/0208118 A1 | 8/2009 | Csurka | |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Perronnin et al. | |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |

(Continued)

OTHER PUBLICATIONS

U.S. Appl. No. 14/303,809, filed Jun. 13, 2014, Wencheng Wu et al.

(Continued)

*Primary Examiner* — Hadi Akhavannik
(74) *Attorney, Agent, or Firm* — Fay Sharpe LLP (57) ABSTRACT

A system and method for object instance localization in an image are disclosed. In the method, keypoints are detected in a target image and candidate regions are detected by matching the detected keypoints to keypoints detected in a set of reference images. Similarity measures between global descriptors computed for the located candidate regions and global descriptors for the reference images are computed and labels are assigned to at least some of the candidate regions based on the computed similarity measures. Performing the region detection based on keypoint matching while performing the labeling based on global descriptors improves object instance detection.

20 Claims, 6 Drawing Sheets

(56) References Cited

U.S. PATENT DOCUMENTS

| | | |
|---|---|---|
| 2011/0072012 A1 | 3/2011 | Ah-Pine et al. |
| 2011/0091105 A1 | 4/2011 | Perronnin |
| 2011/0137898 A1 | 6/2011 | Gordo et al. |
| 2011/0184950 A1 | 7/2011 | Skaff et al. |
| 2012/0045134 A1* | 2/2012 | Perronnin ............ G06K 9/6234 382/197 |
| 2012/0076401 A1 | 3/2012 | Sanchez et al. |
| 2012/0143853 A1 | 6/2012 | Gordo et al. |
| 2012/0158739 A1 | 6/2012 | Ah-Pine et al. |
| 2012/0163715 A1 | 6/2012 | Murray et al. |
| 2013/0159292 A1 | 6/2013 | Larlus et al. |
| 2014/0172643 A1* | 6/2014 | Fazl Ersi ............. G06K 9/4642 705/26.64 |
| 2014/0229160 A1 | 8/2014 | Galle |
| 2014/0270350 A1 | 9/2014 | Rodriguez Serrano et al. |

OTHER PUBLICATIONS

U.S. Appl. No. 14/303,734, filed Jun. 13, 2014, Wencheng Wu et al.
U.S. Appl. No. 14/303,724, filed Jun. 13, 2014, Wencheng Wu et al.
U.S. Appl. No. 14/505,031, filed Oct. 2, 2014, Adrien Gaidon et al.
Bogdan Alexe, et al., "Measuring the objectness of image windows," TPAMI, 34(11): 2189-2202 (2012).
Dana H. Ballard, "Generalizing the Hough transform to detect arbitrary shapes," Pattern recognition, 13(2):111-122 (1981).
Jeffrey S. Beis, et al., "Shape indexing using approximate nearest-neighbour search in high dimensional spaces," Proc. IEEE Computer Society Conf. on Computer Vision and Pattern Recognition, pp. 1000-1006 (1997).
Ming-Ming Cheng, et al., "BING: Binarized normed gradients for objectness estimation at 300fps," IEEE CVPR, pp. 3286-3293 (2014).
Ramazan G. Cinbis, et al., "Segmentation driven object detection with Fisher vectors," ICCV, pp. 2968-2975 (2013).
Dorin Comaniciu, et al. "Mean shift: A robust approach toward feature space analysis" TPAMI, 24(5), 603-619 (2002).
Pedro F. Felzenszwalb, et al., "Efficient graph-based image segmentation," IJCV (59):2, pp. 167-181 (2004).
Ross Girshick, et al., "Rich feature hierarchies for accurate object detection and semantic segmentation," IEEE CVPR, pp. 580-587 (2014).
Philippe-Henri Gosselin, et al., "Revisiting the fisher vector for fine-grained classification," Pattern Recognition Letters, 49: 92-98 (2014).
Edward Hsiao, et al., "Making specific features less discriminative to improve point-based 3D object recognition," IEEE CVPR, pp. 2653-2660 (2010).
Patrick E. Lanigan, "Trinetra: Assistive technologies for grocery shopping for the blind," ISWC, pp. 147-148 (2006).
David G. Lowe, "Object recognition from local scale-invariant features," Proc. 7th IEEE Int'l Conf. on Computer Vision, vol. 2, pp. 1150-1157 (1999).
David G. Lowe, "Distinctive image features from scale-invariant keypoints," Int'l J. Computer Vision, 60(2):91-110 (2004).
Jiri Matas, "Robust wide-baseline stereo from maximally stable extremal regions," Image and Vision Computing, 22(10):761-767 (2004).
Michele Merler, et al., "Recognizing Groceries in Situ Using in Vitro Training Data," IEEE CVPR, pp. 1-8 (2007).
Krystian Mikolajczyk, et al., "An affine invariant interest point detector," Computer Vision ECCV pp. 128-142, Springer (2002).
Krystian Mikolajczyk, et al., "Scale and affine invariant interest point detectors," Int'l J. Computer Vision, 60(1):63-86 (2004).
Krystian Mikolajczyk, et al., "A comparison of affine region detectors," Int'l J. Computer Vision, 65(1-2):43-72 (2005).
Edward Rosten, et al., "Real-time video annotations for augmented reality," Advances in Visual Computing, pp. 294-302, Springer (2005).
Jorge Sanchez, et al., "Improving the fisher kernel for large-scale image classification," Proc. 11$^{th}$ European Conference on Computer Vision (ECCV): Part IV, pp. 143-156 (2010).
Jorge Sanchez, et al., "High-dimensional signature compression for large-scale image classification," CVPR, pp. 1665-1672 (2011).
K. E. A. Van De Sande, et al., "Segmentation as selective search for object recognition," ICCV, 1879-1886 (2011).

* cited by examiner

SYSTEM AND METHOD FOR PRODUCT IDENTIFICATION

BACKGROUND

The exemplary embodiment relates to object recognition and finds particular application in connection with detection of products in a retail environment.

Object detection is a basic problem in image understanding and an active topic of research in computer vision. Given an image and a predefined set of objects or categories, the goal of object detection is to output all regions that contain instances of the considered object or category of objects. Object detection is a challenging task, due to the variety of imaging conditions (e.g., viewpoints, environments, and lighting conditions) and to the scale of the search space where millions of candidate regions often have to be considered for a single image.

Existing object detection algorithms often cast detection as a binary classification problem: given a candidate window and a candidate class, the goal is to determine whether the window contains an object of the considered class or not. This generally includes computing a feature vector describing the window and classifying the feature vector with a binary classifier, e.g., a linear Support Vector Machine (SVM) classifier. Since the candidate windows usually overlap, it is common for more than one candidate window to be placed over the same object instance. A non-maximum suppression step may be performed over all the scored candidates to remove the redundant windows before producing a final score.

A sliding window may be used to scan a large set of possible candidate windows. In this approach, a window is moved stepwise across the image in fixed increments so that a decision is computed for multiple overlapping windows. In practice, this approach uses windows of different sizes and aspect ratios to detect objects at multiple scales, with different shapes, and from different viewpoints. Consequently, millions of windows are tested per image. The computational cost is, therefore, one of the major impediments to practical detection systems.

In the retail environment, the ability to detect and count specific products on store shelves would facilitate many applications, such as counting products, identifying out-of-stock products, and measuring planogram compliance. However, there may be thousands of products that can appear in a shelf image, and shelf images can be of very high resolution. The standard exhaustive approach thus tends not to be practical for retail applications.

Two approaches have been proposed to address this problem. In the first, referred to as region selection, the set of windows that have to be classified is reduced by applying a selection mechanism. For example, one selective search algorithm may produce a few thousand candidate regions in images of a typical size (see, K. E. A. van de Sande, et al., "Segmentation as selective search for object recognition," ICCV, 1879-1886 (2011), hereinafter, "van de Sande"). This algorithm has been successfully used in detection systems (see, Ramazan G. Cinbis, et al., "Segmentation driven object detection with Fisher vectors," ICCV, pp. 2968-2975 (2013); and Ross Girshick, et al., "Rich feature hierarchies for accurate object detection and semantic segmentation," CVPR, pp. 580-587 (2014)). Objectness methods have also been used as a selection mechanism (see, Bogdan Alexe, et al., "Measuring the objectness of image windows," TPAMI, 34(11): 2189-2202 (2012); and Ming-Ming Cheng, et al., "BING: Binarized normed gradients for objectness estimation at 300 fps," CVPR, pp. 3286-3293 (2014), hereinafter, "Cheng, et al."). However, these methods are not well adapted to the retail domain, unlike the natural scenes for which they have been designed.

A second approach is referred to as detection by keypoint matching. This is an alternative approach to sliding-window detection in the case where the considered objects exhibit little intra-class variability (instance-level detection). The method involves detecting repeatable local descriptors which can be used to perform reliable matching between different views of the same object. Product identification in shelf images with computer vision tend to use such techniques (see, Michele Merler, et al., "Recognizing Groceries In Situ Using In Vitro Training Data," CVPR, pp. 1-8 (2007); and Edward Hsiao, et al., "Making specific features less discriminative to improve point-based 3D object recognition," CVPR, pp. 2653-2660 (2010)). Because of the invariance properties of such local descriptors, a few positive matches are typically sufficient to make a decision for standard instance-level detection. However to obtain repeatable invariant features, local descriptors are only extracted at a sparse set of keypoints, thus discarding a very significant amount of information. Losing such information is disadvantageous for fine-grained problems, such as product detection. Consequently, detection approaches based on keypoint matching tend to confuse similar products.

There remains a need for a system and method that allow identification of high quality candidate regions while discriminating between very similar products.

INCORPORATION BY REFERENCE

The following references, the disclosures of which are incorporated herein by reference in their entireties, are mentioned:

U.S. application Ser. No. 14/303,809, filed Jun. 13, 2014, entitled STORE SHELF IMAGING SYSTEM, by Wencheng Wu, et al.

U.S. application Ser. No. 14/303,735, filed Jun. 13, 2014, entitled METHOD AND SYSTEM FOR SPATIAL CHARACTERIZATION OF AN IMAGING SYSTEM, by Wencheng Wu, et al.

U.S. application Ser. No. 14/303,724, filed Jun. 13, 2014, entitled IMAGE PROCESSING METHODS AND SYSTEMS FOR BARCODE AND/OR PRODUCT LABEL RECOGNITION, by Wencheng Wu, et al.

U.S. application Ser. No. 14/505,031, filed Oct. 2, 2014, entitled EFFICIENT OBJECT DETECTION WITH PATCH-LEVEL WINDOW PROCESSING, by Adrien Gaidon, et al.

BRIEF DESCRIPTION

In accordance with one aspect of the exemplary embodiment, a method for object instance localization in an image includes detecting keypoints in each of a set of labeled reference images. Each of the reference images includes an object instance. A target image is received and keypoints are detected in the target image. Candidate regions are located in the target image, based on matching of descriptors of the keypoints detected in the target image with descriptors of the keypoints detected in the reference images. Similarity measures are computed between global descriptors computed for the located candidate regions and global descriptors for the reference images. Labels are assigned to at least some of the candidate regions based on the computed similarity measures.

One or more of the detecting keypoints, locating candidate regions, computing similarity measures, and the assigning of labels may be performed with a processor.

In accordance with another aspect of the exemplary embodiment, a system for object instance localization in an image includes memory which, for each of a set of labeled reference images, stores a global descriptor and a keypoint descriptor for each of a set of keypoints detected in the reference image. Each of the reference images including an object instance. A keypoint detection component detects keypoints in a target image. A keypoint description component describes each of the detected keypoints in the target image with a local descriptor. A keypoint matching component matches keypoints in the target image to keypoints detected in the reference images based on their local descriptors. A candidate region detector locates candidate regions in the target image, based on the matched descriptors. A feature extraction component computes global descriptors for the located candidate regions. A recognition component computes similarity measures between global descriptors computed for the located candidate regions and the global descriptors for the reference images and assigns labels to at least some of the candidate regions based on the computed similarity measures. A processor implements the keypoint detection component, keypoint description component, keypoint matching component, candidate region detector, feature extraction component, and recognition component.

In accordance with another aspect of the exemplary embodiment, a method includes detecting keypoints in a target image, describing each of the detected keypoints with a local descriptor, associating each of a set of labeled reference images with keypoints detected in the reference image, each of the reference images comprising an object instance, matching keypoints in the target image to keypoints in the reference images based on their local descriptors, locating candidate regions in the target image, based on the matched descriptors, computing global descriptors for the located candidate regions, computing similarity measures between global descriptors computed for the located candidate regions and global descriptors computed for the reference images, assigning labels to at least some of the candidate regions based on the computed similarity measures, and outputting information based on the assigned labels.

One or more of the steps of the method may be performed with a processor.

DETAILED DESCRIPTION

Aspects of the exemplary embodiment relate to a system and method for object detection which facilitate fine-grained instance localization in images. The exemplary method includes a candidate region generation stage, based on matching of low-level descriptors between a target image and a set of reference images, and a rescoring stage, where global descriptors are computed and used to produce improved scores and labels for the candidate regions.

The system and method are particularly suited to product detection in a retail context. There, a fine-grained detection is desirable as many products are visually similar, such as the different flavors of a brand of soup, and there may be many instances of the same object appearing in the same image. For practical applications, there may be efficiency constraints, for example, 100 or more objects to be identified in an image. The image may be of high resolution, such as 10 million pixels, or higher.

Figure 1:
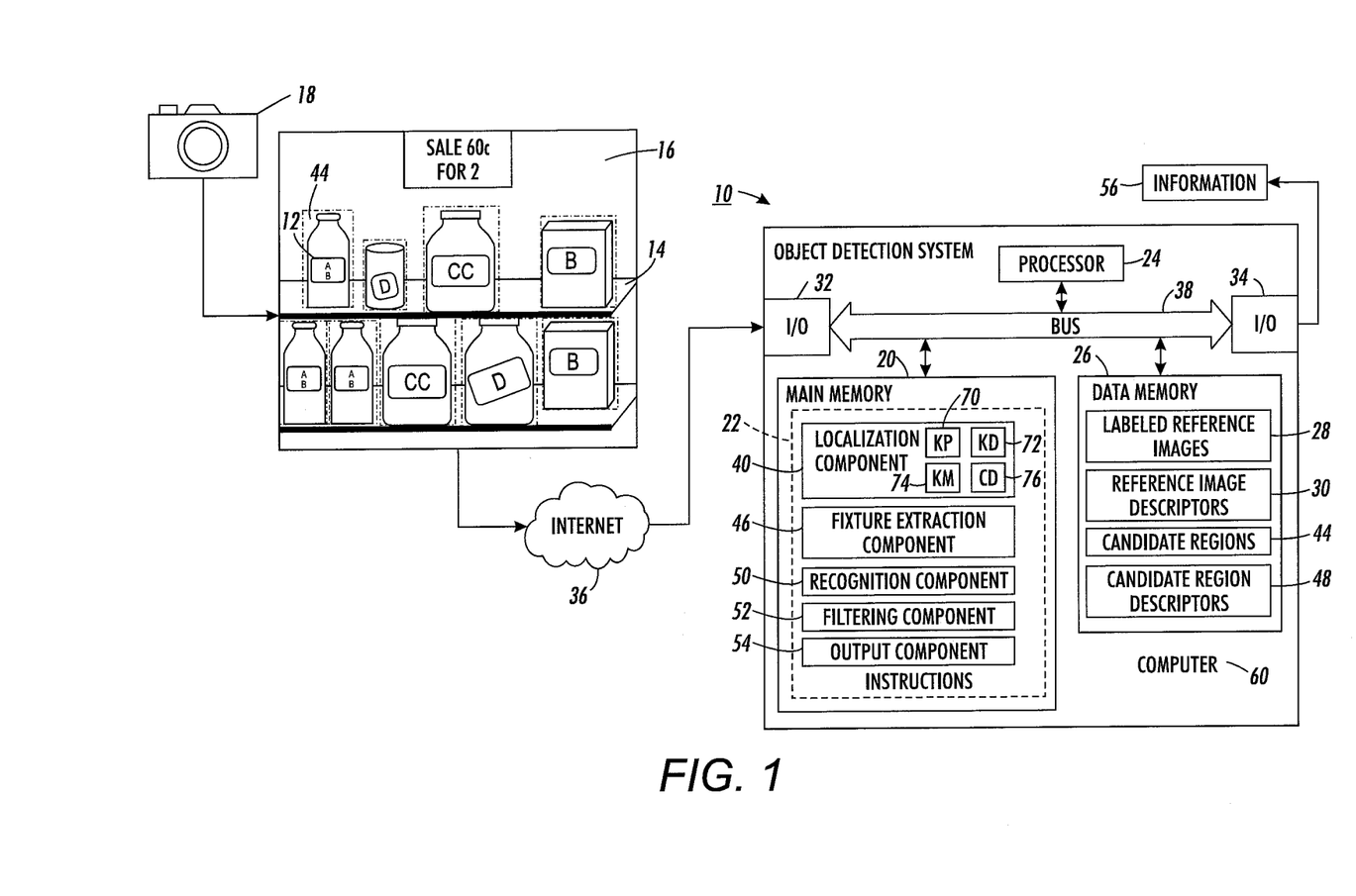
FIG. 1 is a functional block diagram of a system for object detection in accordance with one aspect of the exemplary embodiment.

With reference to FIG. 1, a computer-implemented system 10 for object detection which facilitates localizing and classifying products 12 that appear on a product display unit 14, such as a store shelf unit of a product facility, such as a retail store, distribution warehouse, or the like, is shown. A photographic image 16 (target image) of the product display unit 14, captured with an image capture device 18, such as a camera, is input to the system 10. Many such images may be captured, for example, for covering an entire shelf or all or part of a store.

The system includes main memory 20 which stores instructions 22 for performing the method described with reference to FIG. 2. A processor device 24, in communication with the memory, executes the instructions 22. Data memory 26 stores a set of reference images 28 (each being a standardized shot of the facing of a product) and a corresponding image-level, multidimensional descriptor 30 extracted from each reference image. Each reference image in the reference set includes only a single isolated reference product. Together, the reference images show the standard appearance of all (or at least some) of the products expected to be found in the store images 16. Then, given an image 16 of a store shelf or block of shelves, the objective is to locate and label all the instances of the reference products in that store image. One or more input/output devices 32, 34 allow the system to communicate with external devices, e.g., via a wired or wireless connection 36, such as the Internet. Hardware components 20, 24, 32, 34 of the system 10 communicate via a data/control bus 38.

The system and method are able to produce good product candidate regions (or "windows") in the context of retail images 16 that are discriminative enough to distinguish very similar products.

The exemplary instructions 22 include a localization component 40 which applies one or more localization techniques. The localization technique(s) may compute correspondences between each of the reference images 28 and regions of the target image 16. The localization technique(s) may rely on keypoint detection, keypoint description, and keypoint matching to obtain an accurate localization of objects 12 in the image. For example, a set of candidate regions 44 that are predicted to be locations of objects 12 of interest, is identified.

A feature extraction component 46 extracts a region descriptor 48 from each of the candidate regions 44. The candidate regions 44 may be cropped prior to being described by the region descriptor 48.

A recognition component 50 identifies similar product reference images 28 to the target image, based on a comparison of their descriptors 48, 30.

A filtering component 52 filters the candidate regions to remove at least some of those that are overlapping.

An output component 54 computes and outputs information 56 based on the products recognized by the recognition component 50.

The computer system 10 may include one or more computing devices 60, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 20, 26, which may be separate or combined, may represent any type of non-transitory computer readable medium such as random access memory (RAM), read only memory (ROM), magnetic disk or tape, optical disk, flash memory, or holographic memory. In one embodiment, the memory 20, 26 comprises a combination of random access memory and read only memory. In some embodiments, the processor 24 and memory 20 and/or 26 may be combined in a single chip. Memory 20 stores instructions for performing the exemplary method. Memory 26 stores the processed data. As will be appreciated, part or all of data memory may be located on a different computing or memory storage device from the instructions 22.

The network interface 32, 34 allows the computer to communicate with other devices via a wired or wireless link 36, e.g., a computer network, such as a local area network (LAN) or wide area network (WAN), or the internet, and may comprise a modulator/demodulator (MODEM), a router, a cable, and and/or Ethernet port.

The digital processor 24 can be variously embodied, such as by a single-core processor, a dual-core processor (or more generally by a multiple-core processor), a digital processor and cooperating math coprocessor, a digital controller, or the like. The digital processor 24, in addition to controlling the operation of the computer 60, executes instructions stored in memory 20 for performing the method outlined in FIGS. 2 and 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
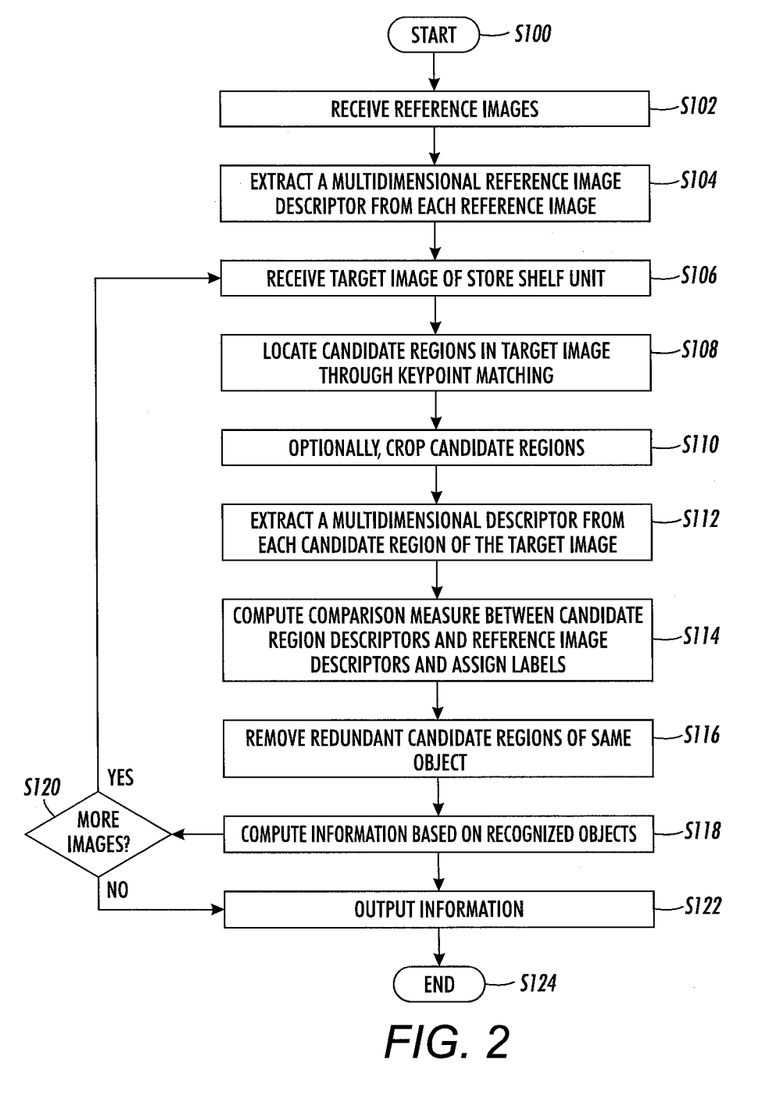
FIG. 2 is a flow chart illustrating a method for object detection in accordance with another aspect of the exemplary embodiment.

FIG. 2 illustrates a method for detection of objects. The method begins at S100.

At S102, a set of reference images 28 is received, one or more reference images for each of a set of products to be recognized, e.g., two or more images of each product captured from different angles. Each reference image is associated with a label corresponding to the product or other object instance present in the reference image. There may be a large number of such reference images, such as at least 50, or at least 100, or up to 1000 or more, depending on the number of products to be recognized.

At S104, a multidimensional descriptor 30 is extracted from each reference image 28 and stored in memory. Each descriptor 30 may be computed through the aggregation of local descriptors, such as a Fisher Vector. Once this step has been done, it can be omitted in subsequent repeats of the method.

At S106, an image 16 in which a collection of objects is expected to be present is received, such as an image of a store shelf.

At S108, candidate regions 44 of the image 16 are located based on keypoint matching with the set of reference images 28.

At S110, the candidate regions 44 may optionally be cropped to generate a bounding box of a size and shape which encompasses the part of the image matching the product.

At S112, a multidimensional global descriptor 48, such as a Fisher vector, of the same dimensionality as the descriptors 30 of the reference images 28, is extracted from each of the optionally cropped, candidate regions 44.

At S114, a similarity measure, such as a dot product, is computed between each of the candidate region descriptors 48 and each (or at least some) of the reference image descriptors 30. Labels are assigned to the candidate regions based on the similarity measures (e.g., assigning the label of the reference image having the highest similarity measure).

At S116, the labeled candidate regions 44 may be filtered by the filtering component 52 to remove redundant regions. For example, non-maximum suppression may be used to remove at least some overlapping candidate regions based on their similarity scores.

At S118, remaining candidate regions labeled with an object label may be used to compute information 56 for the shelf image 16, such as the number of products of each type, their locations on the shelves 14, or the like.

Optionally, at S120, if there are more shelf images 16 to be processed, the method may return to S106, otherwise it proceeds to S122.

At S122, information 56 based on the recognized objects in the image 16 is output by the output component.

The method ends at S124.

Further details on the system and method will now be provided.

In an exemplary embodiment, the two stage method uses keypoint matching in a first stage (S108) to produce a large set of high quality candidate regions in the store image that yield a high recall. In the second stage, high-level descriptors are used to rescore and re-label the candidate regions and to remove redundant detections with non-maximum suppression.

The exemplary two-stage process benefits from the advantages of both localization and recognition techniques:

The good localization properties of matching algorithms are leveraged by the localization component 40 to create a pool of high quality candidate regions 44 (S108). Unlike existing methods, the exemplary localization component targets a high recall (ideally 100% recall) with a very high alignment criterion (e.g., measured as intersection over union (IOU)), i.e., permitting regions with a high overlap to be retained, without seeking a high precision. The high recall can generally be achieved by extracting a few thousand candidate regions 44 from the image 16. However, similar products challenge the recognition ability of localization techniques to identify specific products.

Using matching as the region selection algorithm (S108) has several advantages. In particular, the matching produces an initial class estimate (the reference product it matches) that is optionally used in the verification stage (S114) as additional information. The matching can also be used to estimate an orientation of the candidate product. This allows more discriminative, rotation variant descriptors to be used for the verification stage. The candidate regions can be of any size and aspect ratio, avoiding the limiting assumptions of sliding window approaches, namely a limited set of aspect ratio and sizes. Further, the matching constraints ensure that the produced candidate regions are more accurate than the candidate windows produced by other methods, such as segmentation or objectness. The candidate regions produced by the matching method tend to have a much higher average intersection over union (IOU), a measure of quality of the bounding boxes that define the candidate regions.

The exemplary recognition component 50 makes use of high-level descriptors 48, 30, such as the Fisher Vector, which are well-suited for discriminating between very similar classes in fine-grained recognition, for verifying the identity of the objects detected by the localization component 40. The verification step (S114) may be used to compute a relevant confidence score for each candidate region 44 identified at S108. This score may be used to apply non-maximum suppression (removing multiple detections, which allows counting the products in an image) (S116) and to produce more accurate labels than the ones produced by the matching method.

Images

Images 16, 28 may be received by the system in any convenient file format, such as JPEG, GIF, JBIG, BMP, TIFF, or the like or other common file format used for images and which may optionally be converted to another suitable format prior to processing. Input shelf images 16 may be stored in data memory during processing. The shelf image 16 and references images 28 can be input from any suitable image source 18, such as a camera, workstation, database, memory storage device, such as a disk, or the like. There may be 5, 10, 20, 50, or more reference images, each of a different product and in some cases, the same product may be shown in two or more of the reference images, e.g., from different angles and/or captured under different lighting conditions. In some embodiments, a set of shelf images may be stitched together to form an image 16 of an entire shelf unit.

In general, each input digital image includes image data for an array of pixels forming the image. The image data may include colorant values, such as grayscale values, for each of a set of color separations, such as L*a*b* or RGB, or be expressed in another color space in which different colors can be represented. In general, "grayscale" refers to the optical density value of any single color channel, however expressed (L*a*b*, RGB, YCbCr, etc.). The exemplary method may be used for black and white (monochrome) images as well as color images.

Locating Candidate Regions (S108)

The aim of the matching process is to generate candidate regions (e.g., boxes) 44 in the store image 16 that have a high overlap with the reference products that appear in that image. However, instead of finding candidate regions for all the reference products jointly, the task may be simplified by producing a set of candidate regions for each of the reference products independently and then combining all the sets. This produces thousands of candidate regions. However, the number generated is still much smaller than the exhaustive approach (sliding windows), where a million or more candidate regions may be generated from a single image 16.

The locating of candidate regions 44 may be performed by keypoint (interest-point) matching. As illustrated in FIG. 1, the localization component 40 may include a keypoint detection component (KP) 70, a keypoint description component (KD) 72, a keypoint matching component (KM) 74, and a candidate region detector (CD) 76. The keypoint detection component detects keypoints in the target image 16 and detects keypoints in each of the set of labeled reference images 28. The keypoint description component describes each of the detected keypoints with a local descriptor. The keypoint matching component matches keypoints in the target image to keypoints in the reference images based on their local descriptors. The candidate region detector locates candidate regions in the target image, based on the matched descriptors.

Figure 3:
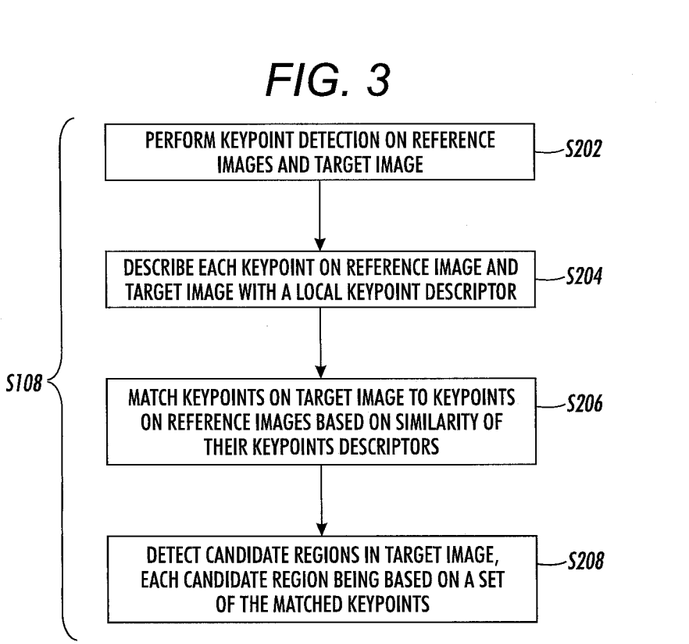
FIG. 3 illustrates location of candidate regions in the method of FIG. 2.

The process to generate candidate boxes 44 can proceed as illustrated in FIG. 3.

At S202, keypoint detection is performed by the keypoint detection component 70. In this step, keypoints are detected on each of the reference images 28 and on the store image 16. This step is performed based on the image content alone, i.e., keypoints in the store image 16 are identified without reference to the reference images 28, and vice versa. As will be appreciated, keypoint detection on each of the reference images 28 may be performed prior to receiving the target image 16, for example, before or after S104. Once the keypoint detection has been performed on the reference images 28, it need not be repeated.

Methods for detection of keypoints which may be used herein are described, for example, in Mikolajczyk, et al., "Scale and affine invariant interest point detectors," Intl J. Computer Vision, 60(1):63-86 (2004); and Mikolajczyk, et al., "A comparison of affine region detectors," Intl J. Computer Vision, 65(1-2):43-72 (2005). Any stable and repeatable interest point detector can be used in the method. The keypoint detector detects points or small regions (both of which are referred to herein as keypoints) that have interesting features, such as edges, shapes, colors, and the like. Examples include blob detectors, such Difference of Gaussians (DoG) detectors (see, David G Lowe, "Object recognition from local scale-invariant features," Proc. 7th IEEE Intl Conf. on Computer Vision, vol. 2, pp. 1150-1157 (1999), hereinafter, Lowe 1999), which computes differences between Gaussian filters computed on the image at different scales, approximating a Laplacian filter; Hessian-Affine detectors (see, Mikolajczyk, et al., "An affine invariant interest point detector," European Conference on Computer Vision (ECCV), pp. 128-142, Springer (2002), hereinafter, "Mikolajczyk 2002"); corner detectors, such as FAST (see, Edward Rosten, et al., "Real-time video annotations for augmented reality," Advances in Visual Computing, pp. 294-302, Springer (2005); Harris-Affine (see, Mikolajczyk 2002), and extremal region detectors, such as a Maximally Stable Extremal Regions detector (see, Matas, "Robust wide-baseline stereo from maximally stable extremal regions," Image and Vision Computing, 22(10):761-767 (2004). One, two, or more of these methods may be used to identify keypoints in the images 16, 28. As an example at least 1000, or at least 5000 keypoints may be detected in the store image 16. Fewer keypoints may be detected in each of the reference product images 28.

At S204, keypoint description is performed by the keypoint description component 72. The keypoint descriptors are each based on a local region of pixels local to the respective keypoint. In this step, a small patch around each of the detected keypoints is described using a local descriptor, e.g., a gradient-based descriptor, such as a SIFT descriptor (see, Lowe, "Distinctive image features from scale-invariant keypoints," Intl J. Computer Vision, 60(2):91-110 (2004), hereinafter, Lowe 2004). To achieve a desired level of invariance, the dominant orientation or affine shape can be estimated in order to compute descriptors on normalized patches. The patches used for computing the keypoint descriptors are small, such as 100 pixels in size or less, or less than $1/10,000^{th}$ of the image pixels.

Figure 4:
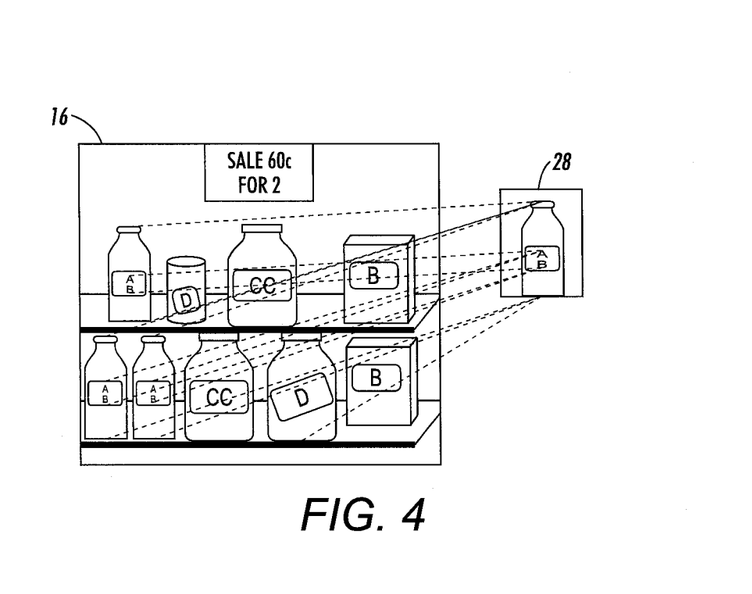
FIG. 4 illustrates keypoint matching.

At S206, keypoint matching is performed by the keypoint matching component (KM) 74. In this step, a descriptor matching process is used to find stable tentative correspondences between the sets of detected keypoints for each reference image separately, similar to the standard SIFT matching (Lowe 2004). FIG. 4 illustrates a small fraction of the matches which may be generated between the keypoints in a reference image 28 and the keypoints in the shelf image 16 based on their keypoint descriptor similarities. For each reference image 28 in turn, a similarity is computed between the keypoint descriptors for the image 16 and the keypoint descriptors for the reference image 28. Based on similarity, a matching is performed between the store image keypoint descriptors and the reference image keypoint descriptors, resulting in each store image keypoint being matched to a respective reference image keypoint with which it is most similar. To filter out matches which are ambiguous, a threshold may be used. For example, a correspondence between a keypoint descriptor in the shelf image 16 and a keypoint in a reference image 28 is accepted if the distance (based on similarity scores) to that target image keypoint from the second nearest keypoint descriptor in the reference product image 28 is at least 1.5×(or other suitable multiplication factor), as to the first nearest keypoint descriptor in that reference product image. This filters out matches for store image keypoints that could reasonably be matched to two points on the same reference image and retains the more robust matches. To do this, an approximate nearest neighbor search can be efficiently computed in sub-linear time, e.g., by using the Best Bin First algorithm (see, Beis, et al., "Shape indexing using approximate nearest-neighbour search in high dimensional spaces," Proc. 1997 IEEE Computer Society Conf. on Computer Vision and Pattern Recognition (CVPR), pp. 1000-1006 (1997), while resulting in a very low loss in the number of correct matches, as shown in Lowe 2004.

At S208, candidate regions 44 are detected by the candidate region detector 76, based on the keypoints in the target image and the matches to reference images based on the similarity scores. As will be appreciated, many of the tentative correspondences between the keypoint descriptors obtained from the shelf image and one reference product image are actually outliers. Such correspondences can be filtered out by an appropriate choice of candidate region generation method.

Many of the conventional methods which utilize keypoint matching assume a single instance of each object, and thus stable matching methods (e.g., that fit correspondences which are mutually nearest neighbors) are applicable. In the retail case, however, a matching algorithm which allows detection of multiple instances of the same product is desirable.

In the exemplary method, once a set of matches between each reference product and the store image has been found at S206, the method used for identifying a set of candidate boxes is one which ignores the matches that are outliers. For example, at S208, the Generalized Hough transform method may be used to verify the tentative correspondences efficiently and to generate candidate regions therefrom, while being robust to a high proportion of outliers in the matches. See, for example, U.S. Pat. No. 3,069,654, issued Dec. 18, 1962, entitled METHOD AND MEANS FOR RECOGNIZING COMPLEX PATTERNS, by Paul V. C. Hough, incorporated herein by reference; Ballard, "Generalizing the Hough transform to detect arbitrary shapes," Pattern recognition, 13(2):111-122 (1981); and Lowe 1999. In this process, for each keypoint in the store image 16, the keypoint is compared to a set of keypoints on a reference image to which the keypoint is matched. Each of the matches in a hypothesis is considered to see if the hypothesis matches are consistent for location and scale. Multiple such hypotheses are considered and the ones which generate the highest matching scores are selected as candidate regions. A low dimensional hypotheses space is created for the object location, e.g., given by the position of the top-left corner of a bounding box and the scale change compared to the reference product. For different product orientations (horizontal, vertical, upside down), a rotation dimension can be added. In this step, at least 500 or at least 1000 candidate regions may be identified in the target image, some of which may be overlapping (in some cases, the same keypoint may be in more than one candidate region). Then, taking into account the scale ratio of the matched keypoints (and optionally their mutual orientation), the corresponding top-left corner coordinates of potential candidate regions are computed and hypotheses about the object location are generated—the estimated coordinates and scale vote in a Hough space. The Hough voting space may be two or three dimensional. Candidate regions 44 are found by thresholding the number of votes in the Hough space, which includes selecting candidate boxes with enough supporting keypoint descriptor matches as candidate regions. For example, a threshold is set on the amount (e.g., number or proportion) of the keypoints in the bounding box which should be matched to keypoints in the reference image for the bounding box to be considered as a candidate region 44. This threshold amount may vary depending on the number of detected keypoints and the likely size of the objects in the store image. Candidate regions 44 can vary in size from quite small up to virtually the entire target image. The candidate regions 44 are, in general, much larger than the patches used for generating the keypoint descriptors, such as at least 10 times or at least 100 times the number of pixels. While the exemplary method generates rectangular candidate regions 44, other shapes can be accommodated in the Hough transform method.

Optionally, at S110, the candidate regions may be cropped to the size of a bounding box which just encompasses a candidate object in the candidate region, although this step may be omitted.

Label Verification Using Global Region Descriptors

The matching scheme described for S108 above may assign a tentative label to each candidate region 44, based on the most matched reference product, as well as a score based on the number of keypoint descriptor matches. However, due to the fine-grained nature of retail products, the scores and labels produced by the matching strategy tend not to be discriminative enough to distinguish two very similar products. This issue is exacerbated by the redundant candidate regions produced by performing the matching of every reference product independently, each one with a different label. Other problems arise when the keypoint detector fails, for example, due to reflections in the reference or target image.

In the exemplary method, a separate process is used for labeling the candidate regions extracted at S108. In the second stage, therefore, a multidimensional candidate region descriptor 48 is extracted from each candidate region (S112). In this step, low-level features are first extracted densely, e.g., from patches of the respective candidate region, and then are aggregated into a single region-level descriptor 48 using a pooling method, such as average or max pooling, and global encoding frameworks, such as bag-of-words or Fisher vectors (which can be seen as a bag of words that encodes higher order statistics). The Fisher vector is thus a global multidimensional representation of the candidate region which is representative of the low-level patch statistics. Spatial information can be incorporated by means of spatial pyramids (the image/candidate region is partitioned into sub-regions at different scales and the Fisher Vectors for these sub-regions are aggregated). For methods of extracting Fisher vectors, see for example, U.S. Pub. No. 20120045134, published Feb. 23, 2012, incorporated herein by reference. A global representation of each reference image 28, such as a Fisher vector is computed in the same manner (S104).

Then at S114, for each candidate region, its similarity with all the reference products is computed. By using global representations 48, 30 computed in the same manner, the similarity score of one candidate region 44 with respect to a reference product image 28 can be obtained simply by computing the dot product (or other similarity measure) between the FV representations 48, 30. Each region 44 is assigned the label and the similarity score of the most similar reference product. By this procedure, each candidate region is assigned a score and a label that are more precise than those produced by the matching step. This impacts both the accuracy of the filtering step (S116) and the quality of the final labels of the remaining regions.

The global representations 48 are very good for scoring and labeling the candidate regions 44. While fairly costly to generate, the overall cost is reduced by only needing to compute them on the candidate regions, which are much fewer than the windows considered in a sliding window approach. Global descriptors, such as Fisher vectors (FVs) computed over densely-extracted low-level features, can produce extremely good results on difficult fine-grained tasks. The Fisher vectors 48, 30 produced are of a fixed length, which is independent of the size of the candidate region 44 or reference image 28 from which they are extracted.

Using Fisher vectors to label the candidate regions in the exemplary verification step (S114) for candidate regions produced by keypoint matching (S108) (which have a very good recall and can be extracted efficiently) is found to improve the scores and labels.

In the exemplary embodiment at S112, the feature extraction component 46 generates a global descriptor (or "signature") 48, 30 for each candidate region 44 and for each reference image 28. The global descriptor can be any suitable high level statistical representation of the region/image, such as a multidimensional vector generated based on features extracted from the image. Fisher Vector representations and Bag-of-Visual-Word representations are exemplary of suitable high-level statistical representations which can be used herein, although other representations for which a similarity score can be computed are also contemplated. The exemplary global descriptors 48, 30 are of a fixed dimensionality, i.e., each global descriptor has the same number of elements.

For example, the feature extraction component 46 includes a patch extractor, which extracts and analyzes low level visual features of patches of the candidate region/image, such as shape, gradient (e.g., SIFT), color features, a combination thereof, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. Each patch includes a plurality of pixels and may include, for example, at least 16 or at least 64 or at least 100 pixels.

The extracted low level features (in the form of a local descriptor, such as a vector or histogram) from each patch can be concatenated and optionally reduced in dimensionality, to form a features vector which serves as the global descriptor. In other approaches, the local descriptors of the patches of an image/region are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM) having a set of mixture model components (Gaussian functions), from which all the local descriptors are emitted. The patches can thus be characterized by a vector of weights, one weight per parameter for each of the Gaussian functions forming the mixture model, as is the case for the Fisher Vector. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., circle, rod, letter, etc.), or the like.

For example, as local descriptors extracted from the patches, SIFT descriptors or other gradient-based feature descriptors, can be used. See, e.g., Lowe 2004. The number of patches per reference image or candidate region is not limited but can be for example, at least 16, or at least 32, or at least 64, or at least 128. Each patch can include at least 4, or at least 16, or at least 32, or at least 64 pixels. In one illustrative example employing SIFT features, the features are extracted from 24×24 pixel patches of the candidate region on regular grids (every 4 pixels) at five scales, using 128-dimensional SIFT descriptors. The number of features in each local descriptor is optionally reduced, e.g., to 64 dimensions, using Principal Component Analysis (PCA). Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used.

In some illustrative examples, a Fisher vector is computed for the candidate region (and similarly, for the reference image) by modeling the extracted local descriptors of the image/candidate region using a mixture model to generate a corresponding image/candidate region vector having vector elements that are indicative of parameters of mixture model components of the mixture model representing the extracted local descriptors of the image/candidate region. The exemplary mixture model is a Gaussian mixture model (GMM) comprising a set of Gaussian functions (Gaussians) to which weights are assigned in the parameter training. Each Gaussian is represented by its mean vector and covariance matrix. For example, there may be at least 32, or at least 64, or at least 128, or at least 512 Gaussians in the GMM. It can be assumed that the covariance matrices are diagonal. See, e.g., Perronnin, et al., "Fisher kernels on visual vocabularies for image categorization" in CVPR (2007). Methods for computing Fisher vectors are more fully described in U.S. Pub. Nos. 20120076401, 20120045134, and in Jorge Sánchez, and Thomas Mensink, "Improving the fisher kernel for large-scale image classification," Proc. 11$^{th}$ European Conference on Computer Vision (ECCV): Part IV, pp. 143-156 (2010), and Jorge Sánchez and Florent Perronnin, "High-dimensional signature compression for large-scale image classification," in CVPR 2011, the disclosures of which are incorporated herein by reference in their entireties. The trained GMM is intended to describe the content of any image within a range of interest (for example, any store product if the range of interest is store products).

Other methods for computing global descriptors are described, for example, in U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120143853; 20120158739; 20120163715; 20130159292; 20140229160; and 20140270350.

In the exemplary embodiment, the output of S114 is a single label and a corresponding score for that label for each candidate region 44. The label is the label of the product shown in a reference image for which the similarity score between respective global descriptors is highest. However, it is also contemplated that a candidate region may have more than on label and corresponding score.

Filtering Candidate Regions Using Non-Maximum Suppression (NMS) (S116)

The matching process (S108) produces thousands of candidate regions 44, based on the matched reference products 28, and the number of matches found in the Hough voting space. However, to solve the product identification problem using object detection, each product instance on the shelf image 16 should be located at most once (i.e., no more than one labeled candidate region per object instance). Indeed, multiple detections of the same product are counted as errors for many of the targeted applications. Since the number of products in a shelf is generally much smaller than the number of generated candidate regions 44, without some type of filtering, the precision of the system may thus be too low.

One exemplary method for filtering the labeled candidate regions involves removing redundant candidate regions with non-maximum suppression (NMS). This can be performed by ranking all the candidate regions based on their similarity scores in descending order and iterating through all the candidate regions from the top down. Given a candidate region, all the candidate regions that have a lower score and larger than a threshold measure of overlap (such as an intersection over union (IOU) which larger than a threshold IOU) are removed. IOU is defined as the area of overlap of two regions divided by the union of their areas (areas can be measured in terms of number of pixels). The selected NMS threshold may be application-dependent and can be cross-validated for performance, although thresholds of IOU from about 0.1 to 0.3 have been found to work well in practice.

In this step, given a cluster of candidate regions that have a large overlap between them, NMS filters out regions of high overlap that have lower scores and keeps only the candidate region(s) with the largest score that do not overlap each other significantly, reducing the number of final candidate regions. This step is helped by having an accurate method for scoring the candidate regions at S114, i.e., one which gives a large score to candidate regions that have a large overlap with the shelf products and a low score to candidate regions that do not have a good overlap with the shelf products. As a result, the precision of the NMS suppression can be higher than could be achieved when the labels are generated by keypoint matching alone. The high-level global descriptors described above used to rescore and relabel the candidate regions can provide such an accurate method.

Generating and Outputting Information (S118)

The information output by the output component at S118 may simply be the identification of the candidate regions (remaining after filtering) and and/or their labels for the target image. In other embodiments, the information on the candidate regions and their labels may be used to count the number of each product on the store shelves or to determine whether a threshold number of each product is visible to consumers.

In some embodiments, the information is used for generating a spatial layout of a retail facility, also known as a store profile. The store profile may be in the form of a 2-dimensional or 3-dimensional plan of the store which indicates the locations of products, for example, by providing product data for each product, such as an SKU or barcode, and an associated location, such as x,y coordinates, a position on an aisle, or a position on a predefined path, such as a walking path through the store.

In other embodiments, the information on the locations of the candidate regions and their labels may be used to confirm whether the shelf layout complies with a planogram. This is a layout of the store shelf, designating a region of the shelf where each of the products is to be located and in some cases, a number of each product that are to be visible.

As will be appreciated, any of the foregoing information or information based thereon may be output at S118.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 60, (for example, an internal hard drive of RAM), or may be separate (for example, an external hard drive operatively connected with the computer 60), or may be separate and accessed via a digital data network such as a local area network (LAN) or the Internet (for example, as a redundant array of inexpensive of independent disks (RAID) or other network server storage that is indirectly accessed by the computer 60, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the method for detection of objects. As will be appreciated, while the steps of the method may all be computer implemented, in some embodiments one or more of the steps may be at least partially performed manually.

Without intending to limit the scope of the exemplary embodiment, the following examples demonstrate the applicability of the method.

EXAMPLES

High resolution reference images 28 of 46 different retail products and high-resolution (7,576×3,568 pixels) shelf images 16 containing 192 instances of products were obtained. The aim was to localize and annotate all the instances of the reference products in each shelf image by producing a bounding box around the product and assigning it a label.

The matching step (S108) was performed as follows. For keypoint detection, a Difference of Gaussians (DoG) detector was used, since it was found to yield good results in preliminary experiments. Keypoints are described with SIFT descriptors, that are subsequently square-rooted. The matching step accepts a correspondence for a descriptor of a region in the shelf image if the second nearest descriptor in the product image is at least 1.5× as far as the first nearest descriptor. Finally, Hough transform hypotheses with more than 10 votes (i.e., matching keypoints) are then used to produce candidate regions.

The candidate regions 44 produced by the matching are rescored using the similarity between the Fisher Vector of the candidate region and the most similar Fisher-Vector of all the reference images. To compute Fisher-Vector representations, patches are extracted in a dense and multi-scale manner and each patch is described with a SIFT descriptor. The SIFT descriptors are reduced to 64 dimensions using a PCA projection, and compared to a visual codebook of 512 Gaussians. The final Fisher Vector for the candidate region is the concatenation of Fisher-Vector representations computed in each bin of a spatial pyramid (for the spatial pyramid, the following split was used: 1×1, 2×2 and 1×3).

In the data used for experimental validation, some of the products that appear on the shelves do not correspond to any reference product and thus should not be recognized. In a more realistic scenario, however, it is expected that all the products in the shelves also appear as reference products. For evaluation purposes, the unknown products in the shelf image are ignored and the candidate regions that only overlap with them are removed.

Two types of experiments were performed. In the first, the aim was to assess the quality of candidate regions produced by the matching strategy (S108) in terms of recall and average intersection over union (IOU). The goal is to produce candidate regions that tightly cover all the products in the shelves. If the candidate boxes do not accurately cover the products in the shelves, those products will be missed by the recognition component independently of the quality of the scoring strategy.

In the second type of experiments, the precision of the labeling was also evaluated, by taking into account the labels assigned to the candidate regions and the effectiveness of the non-maximum suppression based on the scores of the candidate regions, both before and after the FV rescoring.

1. Evaluation of Recall

The evaluation of the candidate regions found by the matching approach focused on recall, i.e., the percentage of the products on the shelf that are covered enough with a candidate region. In detection, a bounding box may be considered correctly placed if its intersection over union with the ground truth (actual product) is larger than 0.5. However, other IOU thresholds can be considered: lowering the threshold leads to accepting as good, bounding boxes that are more loosely intersecting, and a higher threshold leads to only accepting tight bounding boxes. Related to this, a good measure of the quality of candidate bounding boxes is the average IOU, i.e., how much the candidate boxes overlap, on average, with the ground-truth. A larger value indicates that the candidate bounding boxes are more accurate. This is particularly relevant, because, for the rescoring purposes with global descriptors, the tighter the candidate boxes are, the more accurate the global descriptor will be.

The results of the exemplary matching step are shown in Table 1 in terms of number of candidate regions produced, average IOU, and recall at several IOU thresholds. The results are compared with other existing approaches to compute candidate boxes for object detection: Selective Search (van de Sande) and Bing (Cheng, et al.).

TABLE 1

Quality of the candidate bounding boxes produced by different methods in terms of recall and IOU

| Method | Number of windows | Average IOU | Recall [IOU@0.7] | Recall [IOU@0.5] | Recall [IOU@0.3] |
|---|---|---|---|---|---|
| Exemplary Matching | 8168 | 59.3% | 88.89% | 97.04% | 97.04% |
| Selective Search | 7122 | 16.2% | 13.33% | 70.37% | 97.78% |
| Bing | 3027 | 15.3% | 2.22% | 30.37% | 73.33% |

It can be seen from Table 1 that the exemplary matching approach yields a much higher average IOU than the other methods. This is likely due to the keypoint matching enforcing candidate regions to be similar to that of a reference product, while other methods do not. It is clear that for tight bounding boxes (achieving at least a 0.5 or 0.7 IOU with the product), the matching strategy is superior, in terms of recall, to the other methods. For very tight bounding boxes (having at least 0.7 IOU), the differences in recall are particularly noticeable. This suggests that, for the product localization task, using methods such as selective search or Bing without any tuning does not achieve the results obtained in the present method designed for instance matching. For the rest of the experiments, the method focuses only on the candidate regions produced by the matching strategy.

2. Evaluation of Precision and Recall

In these experiments, the evaluation is not only of the recall of the candidate regions, but also the quality in terms of labels (i.e., given a candidate region that overlaps enough with a shelf product, is it assigned the correct label?) and of redundant candidate regions (does the non-maximum suppression remove the correct candidate regions?).

Figure 5:
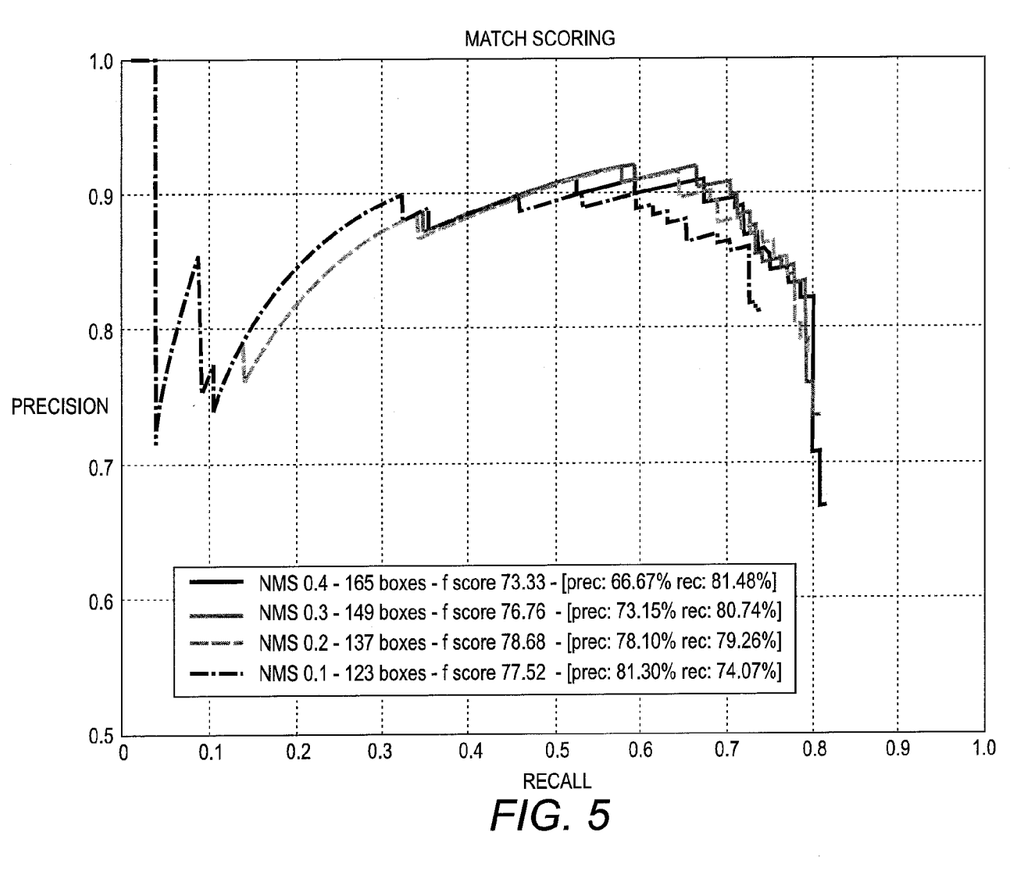
FIG. 5 shows precision-recall plots for the scores and labels assigned by a baseline matching method for several Non-Maximum Suppression (NMS) parameters, using an intersection over union (IOU) threshold of 0.5.
Figure 6:
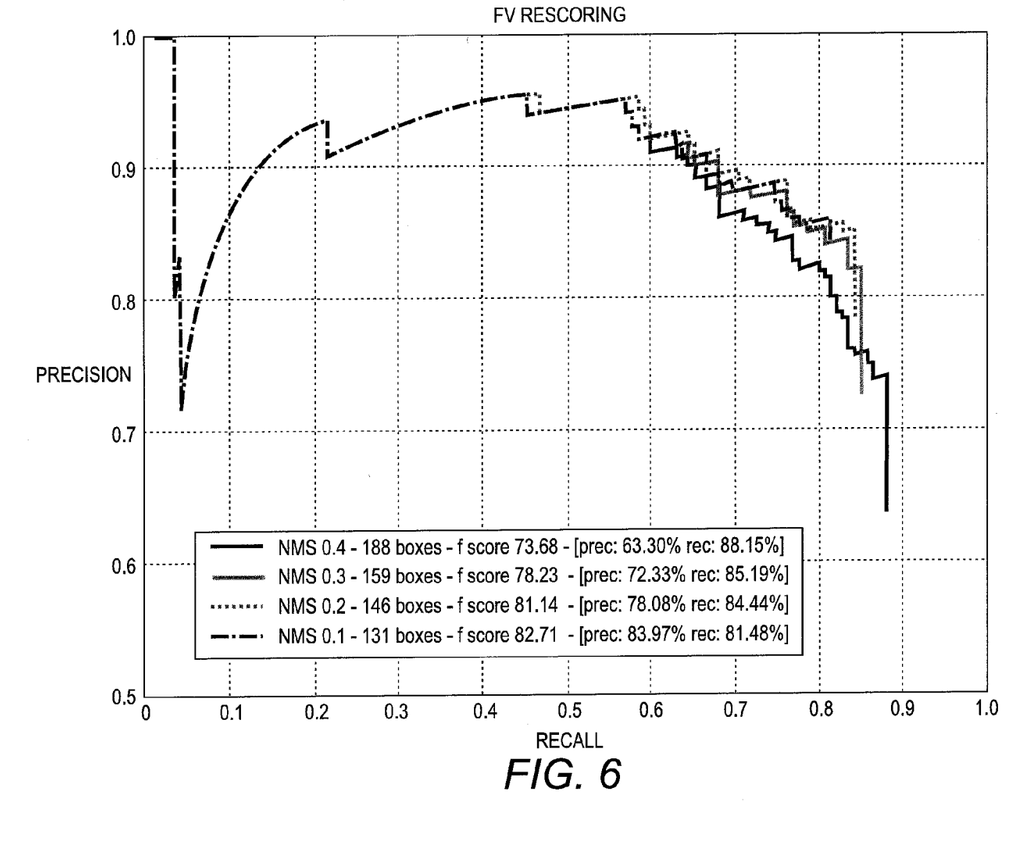
FIG. 6 shows precision-recall plots for the scores and labels assigned with Fisher Vector (FV) rescoring for several NMS parameters, using an IOU threshold of 0.5.

FIGS. 5 and 6 show precision-recall curves for the scores and labels assigned by the matching method alone (used as a baseline for these experiments) and for the scores and labels assigned by the FV rescoring, following matching (the exemplary recognition method). The final precision and recall values and the f-score (a weighted average of precision and recall, which varies between 0—worst, and 100—best) are determined for different IOU thresholds in the NMS stage.

As discussed above, the threshold of the non-maximum suppression can have an effect on the final performance: a small threshold will remove more candidate regions, potentially improving the precision of the system but reducing its recall. For example, in the key for FIG. 5, the first plot is for an IOU threshold of 0.4, i.e., requiring a high level of overlap between two candidate regions before one of the candidate regions is filtered out. This results in a relatively large number of candidate regions (165) remaining and a lower f-score than for the other IOUs tested. FIGS. 5 and 6 show the results for several NMS thresholds, illustrating this behavior. As can be seen, for each NMS threshold, using the FV for computing similarity provides a higher f-score. As will be appreciated from FIG. 6, the system can be tailored to the needs of different applications by selecting an IOU giving an optimal combination of recall and precision for that application. When the objective is to produce a good combination of recall and precision, the f-score can be used to identify the IOU. This appears to be at an IOU of less than 0.2 for the application studied here, since an IOU of 0.1 gives the highest f-score.

Figure 7:
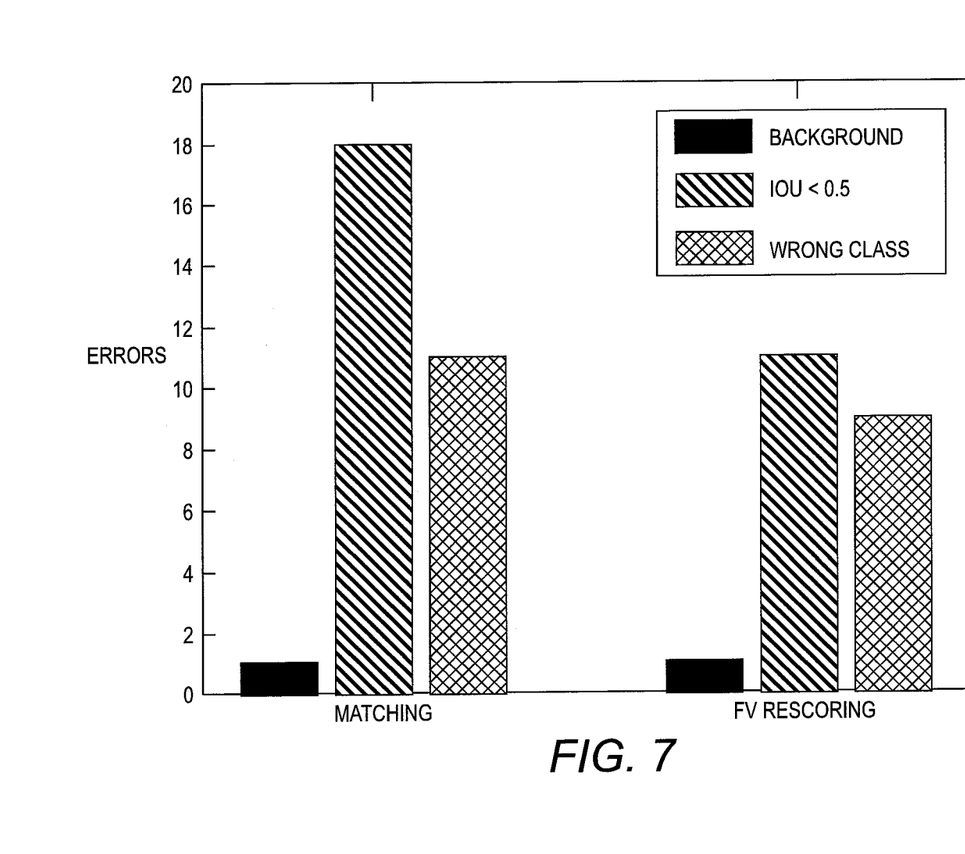
FIG. 7 graphically shows the nature of the detection errors for the baseline matching method (matching) and for the exemplary method (FV rescoring), with an IOU threshold of 0.5.

FIG. 7 illustrates the causes of errors using the direct matching scores and labels and those generated by FV rescoring. In general, two significant types of errors are found when using the baseline matching method alone: candidate regions that have a low IOU with the ground truth, and wrong labels assigned. The number of errors due to incorrect labeling as "background" was not impacted.

From these results, it is evident that using a discriminative global representation to rescore candidate regions identified by matching can lead to significant improvements in the results. As shown in FIG. 7, by using FVs for rescoring, two goals can be achieved. First, the better scores lead to more accurate non-maximum suppression that removes more candidate regions while preserving better ones. Hence, the lower number of candidate regions that have a low IOU when using the FV rescoring. Second, since the global representation is more discriminative for fine-grained tasks, it is also better at producing the correct label.

3. Qualitative Comparison with Super-Pixel Methods

One possible way to extract candidate regions is to apply an unsupervised segmentation algorithm. Such methods aim at extracting foreground objects when they differ enough from the background. They produce a partition of the image into super-pixels. Two methods were evaluated (Dorin Comaniciu, et al., "Mean shift: A robust approach toward feature space analysis" TPAMI, 24(5), 603-619 (2002) and Pedro F. Felzenszwalb, et al., "Efficient graph-based image segmentation," IJCV (59):2, pp. 167-181 (2004). By examining the results obtained qualitatively (not shown) these methods were found to be not well adapted to retail images. They tend to split objects in several regions, and to merge regions coming from several instances next to each other. Consequently, these methods may be considered less useful as candidate region selection mechanisms.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for object instance localization in an image comprising:
   detecting keypoints in each of a set of labeled reference images, each of the reference images comprising an object instance;
   describing each of the detected keypoints in the reference images with a local descriptor based on a region of pixels local to the respective keypoint;
   receiving a target image;
   detecting keypoints in the target image;
   describing each of the detected keypoints in the target image with a local descriptor based on a region of pixels local to the respective keypoint;
   locating candidate regions in the target image, based on matching of keypoints detected in the target image with keypoints detected in the reference images based on their local descriptors; and
   computing similarity measures between global descriptors computed for the located candidate regions and global descriptors for the reference images; and
   assigning labels to at least some of the candidate regions based on the computed similarity measures;
   wherein at least one of the detecting keypoints, locating candidate regions, computing similarity measures, and the assigning of labels is performed with a processor.

2. The method of claim 1, wherein the target image is of a product display unit which displays a collection of products and the object instances are products.

3. The method of claim 1, further comprising computing a global descriptor for each of the at least some of the located candidate regions and for each reference image.

4. The method of claim 3, wherein the computing of the global descriptors comprises for each of the candidate regions and reference images, extracting local descriptors from patches of the respective candidate region or reference image and generating a global descriptor having elements indicative of parameters of mixture model components of a mixture model representing the extracted local descriptors.

5. The method of claim 1, wherein the global descriptors are Fisher Vectors.

6. The method of claim 1, wherein the global descriptors are fixed length vectors.

7. The method of claim 1, wherein the keypoint descriptors are gradient descriptors.

8. The method of claim 1, wherein locating candidate regions comprises computing a Hough transform on subsets of the matched keypoints to generate the candidate regions.

9. The method of claim 1, wherein each of the keypoint descriptors describes a local region of image pixels which contains fewer than one tenth of the image pixels in each candidate region.

10. The method of claim 1, further comprising filtering the candidate regions to remove at least some overlapping candidate regions.

11. The method of claim 10, wherein the filtering is performed by non-maximum suppression with a threshold overlap measure.

12. The method of claim 10, wherein the computing of the global descriptors of the candidate regions is performed prior to the filtering of the candidate regions, the filtering being based on the computed similarity measures.

13. The method of claim 1, wherein the detecting keypoints in the target image is performed without reference to the reference images.

14. A method for object instance localization in an image comprising:
  detecting keypoints in each of a set of labeled reference images, each of the reference images comprising an object instance;
  receiving a target image;
  detecting keypoints in the target image, the detecting including at least one of Difference of Gaussians (DoG) detection, Hessian-Affine detection, corner detection, Harris-Affine detection, and extremal region detection;
  locating candidate regions in the target image, based on matching of descriptors of the keypoints detected in the target image with descriptors of the keypoints detected in the reference images;
  computing similarity measures between global descriptors computed for the located candidate regions and global descriptors for the reference images; and
  assigning labels to at least some of the candidate regions based on the computed similarity measures;
  wherein at least one of the detecting keypoints, locating candidate regions, computing similarity measures, and the assigning of labels is performed with a processor.

15. The method of claim 1, further comprising outputting information based on the assigned labels.

16. A computer program product comprising a non-transitory recording medium storing instructions, which when executed on a computer causes the computer to perform the method of claim 1.

17. A system comprising memory which stores instructions for performing the method of claim 1 and a processor in communication with the memory for executing the instructions.

18. A system for object instance localization in an image comprising:
  memory which, for each of a set of labeled reference images, stores a global descriptor and a keypoint descriptor for each of a set of keypoints detected in the reference image, each of the reference images comprising an object instance;
  a keypoint detection component which detects keypoints in a target image;
  a keypoint description component which describes each of the detected keypoints in the target image with a local descriptor;
  a keypoint matching component which matches keypoints in the target image to keypoints in the reference images based on their local descriptors;
  a candidate region detector which locates candidate regions in the target image, based on the matched descriptors;
  a feature extraction component which computes global descriptors for the located candidate regions;
  a recognition component which computes similarity measures between the global descriptors computed for the located candidate regions and the global descriptors for the reference images and assigns labels to at least some of the candidate regions based on the computed similarity measures; and
  a processor which implements the keypoint detection component, keypoint description component, keypoint matching component, candidate region detector, feature extraction component, and recognition component.

19. The system of claim 18, further comprising a filtering component which filters the labeled candidate regions to remove at least some overlapping candidate regions.

20. A method comprising:
  with a processor:
  detecting keypoints in a target image based on the image content of the target image;
  describing each of the detected keypoints with a local descriptor;
  associating each of a set of labeled reference images with keypoints detected in the reference image, each of the reference images comprising an object instance;
  matching keypoints in the target image to keypoints in the reference images based on their local descriptors;
  locating candidate regions in the target image, based on the matched descriptors;
  computing global descriptors for the located candidate regions;
  computing similarity measures between the global descriptors computed for the located candidate regions and global descriptors computed for the reference images;
  assigning labels to at least some of the candidate regions based on the computed similarity measures; and
  outputting information based on the assigned labels.

* * * * *